United States Patent
Raabe et al.

(10) Patent No.: US 12,025,991 B2
(45) Date of Patent: Jul. 2, 2024

(54) UNMANNED AIRCRAFT

(71) Applicant: ACSL Ltd., Tokyo (JP)

(72) Inventors: Christopher Thomas Raabe, Tokyo (JP); Niklas Bergstrom, Tokyo (JP); Shosuke Inoue, Tokyo (JP)

(73) Assignee: ACSL Ltd., Tokyo (JP)

( * ) Notice: Subject to any disclaimer, the term of this patent is extended or adjusted under 35 U.S.C. 154(b) by 767 days.

(21) Appl. No.: 17/041,726

(22) PCT Filed: Mar. 27, 2018

(86) PCT No.: PCT/JP2018/012534
§ 371 (c)(1),
(2) Date: Sep. 25, 2020

(87) PCT Pub. No.: WO2019/186713
PCT Pub. Date: Oct. 3, 2019

(65) Prior Publication Data
US 2021/0011492 A1    Jan. 14, 2021

(51) Int. Cl.
*G05D 1/00*     (2024.01)
*B64C 39/02*    (2023.01)
(Continued)

(52) U.S. Cl.
CPC ........... *G05D 1/101* (2013.01); *B64C 39/024* (2013.01); *B64D 1/10* (2013.01); *B64D 1/12* (2013.01);
(Continued)

(58) Field of Classification Search
CPC ........ G05D 1/101; G05D 1/12; G05D 1/0676; B64C 39/024; B64D 1/10; B64D 1/12;
(Continued)

(56) References Cited

U.S. PATENT DOCUMENTS 3,027,841 A * 4/1962 Dixson .............. G01C 21/1652
                                                  244/175
9,567,081 B1    2/2017 Beckman
(Continued)

FOREIGN PATENT DOCUMENTS

JP    2006-501116 A    1/2006
JP    2016-153337 A    8/2016
(Continued)

OTHER PUBLICATIONS

International Search Report mailed on May 22, 2018, issued in connection with International Application No. PCT/JP2018/012534, filed on Mar. 27, 2018, 4 pages.
(Continued)

*Primary Examiner* — Donald J Wallace
*Assistant Examiner* — Jalal C Coduroglu
(74) *Attorney, Agent, or Firm* — McDonnell Boehnen Hulbert & Berghoff LLP

(57) ABSTRACT

Provided is an unmanned aircraft that is used to quickly and accurately specify a target location and operate a specific mechanism having a predetermined function at the target location. An unmanned aircraft 100 refers to a target location marker pattern 120*d*3 representing an appearance of a target location marker 161 disposed to have a predetermined relative position relationship with the target location, detects an image portion corresponding to the target location marker 161 from an image obtained by a camera 106 that obtains the image below the unmanned aircraft 100, and is guided directly above the target location, based on the image portion, where the specific mechanism is operated.

11 Claims, 12 Drawing Sheets

(51) Int. Cl.
    *B64D 1/10*         (2006.01)
    *B64D 1/12*         (2006.01)
    *B64D 9/00*         (2006.01)
    *B64D 47/08*        (2006.01)
    *B64U 10/13*        (2023.01)
    *B64U 101/60*      (2023.01)
    *G06K 19/06*       (2006.01)
    *H04N 7/18*        (2006.01)

(52) U.S. Cl.
    CPC .............. *B64D 9/00* (2013.01); *B64D 47/08*
    (2013.01); *G05D 1/12* (2013.01); *B64U 10/13*
    (2023.01); *B64U 2101/60* (2023.01); *B64U*
    *2201/10* (2023.01); *G06K 19/06037* (2013.01);
    *H04N 7/18* (2013.01)

(58) Field of Classification Search
    CPC . B64D 9/00; B64D 47/08; B64D 1/22; B64U
            10/13; B64U 2101/60; B64U 2201/10;
            G06K 19/06037; H04N 7/18; H04N
            7/183
    See application file for complete search history.

(56) References Cited

U.S. PATENT DOCUMENTS

| | | | | |
|---|---|---|---|---|
| 10,507,914 | B2 * | 12/2019 | Walker | H02G 11/02 |
| 11,235,890 | B1 * | 2/2022 | Dahlstrom | B05C 11/1005 |
| 2003/0225492 | A1 * | 12/2003 | Cope | G07C 5/008 |
| | | | | 701/14 |
| 2005/0232626 | A1 | 10/2005 | Schulte et al. | |
| 2009/0062973 | A1 * | 3/2009 | Caldeira | G05D 1/0833 |
| | | | | 701/4 |
| 2009/0069957 | A1 * | 3/2009 | Nakamura | G05D 1/0094 |
| | | | | 701/3 |
| 2012/0061507 | A1 * | 3/2012 | Grabmeier | B64D 5/00 |
| | | | | 244/137.4 |
| 2014/0025230 | A1 * | 1/2014 | Levien | G05D 1/102 |
| | | | | 701/2 |
| 2014/0257595 | A1 * | 9/2014 | Tillmann | B64C 39/024 |
| | | | | 701/2 |
| 2015/0151837 | A1 | 6/2015 | Sane | |
| 2015/0205301 | A1 * | 7/2015 | Gilmore | G01S 19/13 |
| | | | | 701/11 |
| 2016/0068264 | A1 | 3/2016 | Ganesh et al. | |
| 2016/0328983 | A1 * | 11/2016 | Hutchinson | G08G 5/0069 |
| 2016/0332851 | A1 * | 11/2016 | Bialkowski | G05D 1/0858 |
| 2017/0001724 | A1 * | 1/2017 | Yates | B64C 39/024 |
| 2017/0011333 | A1 * | 1/2017 | Greiner | B64D 47/08 |
| 2017/0158342 | A1 * | 6/2017 | Ishii | B64D 31/10 |
| 2017/0197718 | A1 * | 7/2017 | Buchmueller | B64D 1/22 |
| 2017/0253335 | A1 * | 9/2017 | Thompson | G06Q 10/083 |
| 2017/0287341 | A1 * | 10/2017 | Jarrell | B64F 1/362 |
| 2018/0330623 | A1 | 11/2018 | Fujita et al. | |
| 2019/0019141 | A1 | 1/2019 | Torii et al. | |

FOREIGN PATENT DOCUMENTS

| | | | | |
|---|---|---|---|---|
| JP | 2017-058937 | A | 3/2017 | |
| JP | 2017-534101 | A | 11/2017 | |
| WO | WO-2012140191 | A1 * | 10/2012 | ............. B64C 13/20 |
| WO | 2017/081898 | A1 | 5/2017 | |
| WO | 2017/115446 | A1 | 7/2017 | |

OTHER PUBLICATIONS

Written Opinion mailed on May 22, 2018, issued in connection with International Application No. PCT/JP2018/012534, filed on Mar. 27, 2018, 4 pages.

* cited by examiner

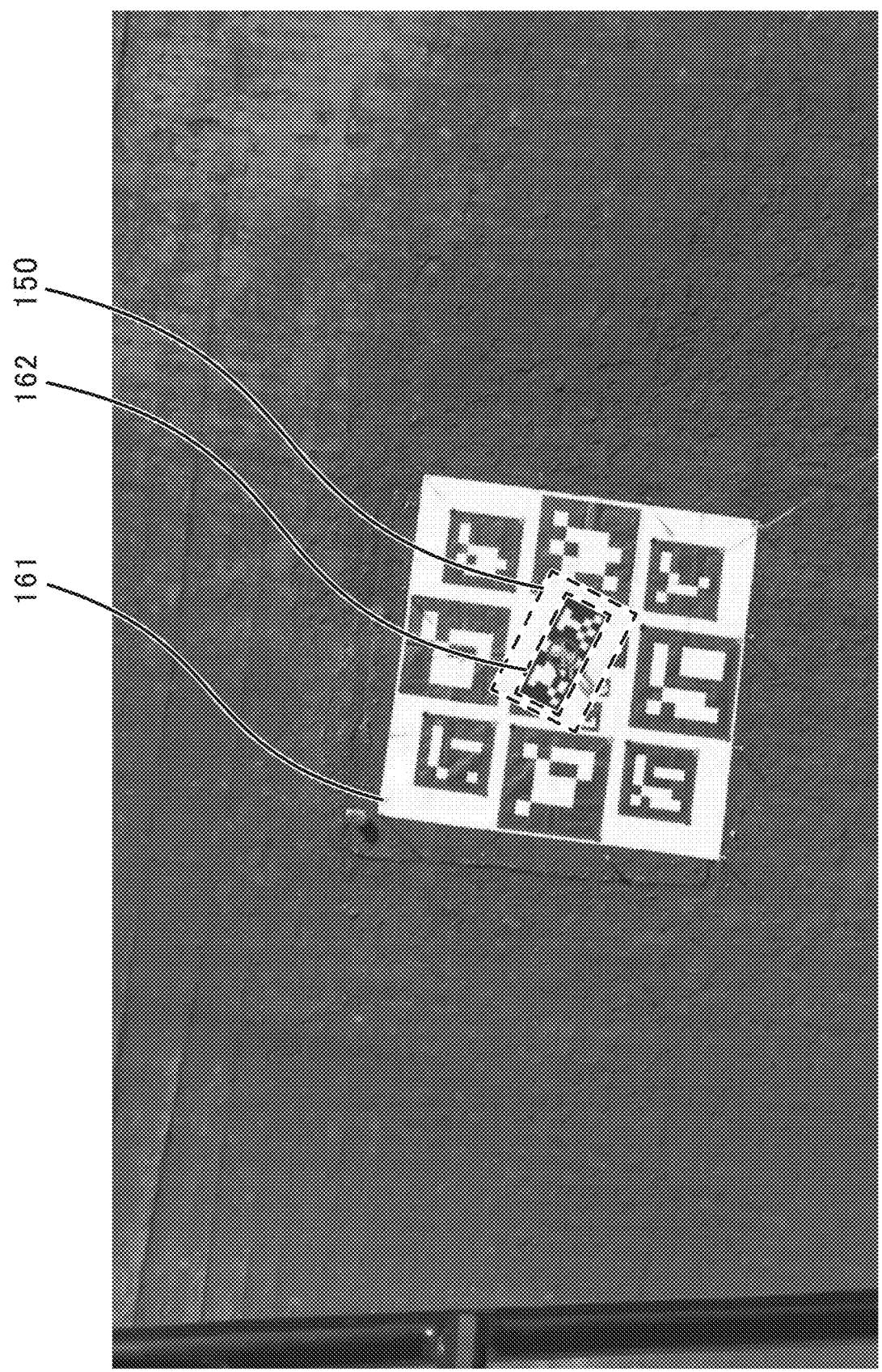

UNMANNED AIRCRAFT

CROSS-REFERENCE TO RELATED APPLICATION

This application is a U.S. National Phase Application under 35 U.S.C. § 371 of International Application No. PCT/JP2018/012534, filed Mar. 27, 2018, which is incorporated herein by reference in its entirety.

TECHNICAL FIELD

The present invention relates to an unmanned aircraft, and in particular, to an unmanned aircraft including a cord having a predetermined portion to which a specific mechanism having a predetermined function is attached. More specifically, the present invention relates to an unmanned aircraft that holds a delivery object with a tip of a tether to deliver the object to a target location.

BACKGROUND ART

If it is possible to reliably deliver a delivery object to a predetermined target location with an unmanned aircraft, an extremely convenient delivery system can be constructed. To this end, several suggestions have been made as to such a delivery system.

As a conventional technology, to improve an efficiency of home delivery business by overcoming limitations to a reach range of a drone when putting home delivery with the drone into practical use, a delivery system is present in which a delivery vehicle 100 conveys a package to be delivered and a drone 210 to perform home delivery. Here, this delivery vehicle includes a space for takeoff and landing and a package delivery port in a ceiling thereof, and also includes means for supplying the package to this package delivery port, and the drone that has received the package flies to home to which the package is delivered, and performs home delivery. After finishing the home delivery with this drone in a specific area, the delivery vehicle moves to another area together with the drone and performs further home delivery (Patent Literature 1). However, this delivery system does not include any special means for accurately reaching a home delivery destination, and it is not clear whether accurate delivery is possible.

As a further conventional technology, a system is present in which to secure a drone that delivers a package of goods to a delivery destination, the drone can receive a purchase code associated with purchase of the package of goods, and the drone can land in a landing zone at the delivery destination, when the purchase code is authenticated (Patent Literature 2). This system can be set up in a landing site at a known position of a wireless access point determined and detected with GNSS positioning, by means of recognition of a camera base, a wireless beacon, or the like (paragraph 0019). However, this system does not include any special means for accurately lowering a delivery object down to a target location, and it is not clear whether accurate delivery to the target location is possible.

CITATION LIST

Patent Literature

Patent Literature 1: Japanese Patent Laid-Open No. 2016-153337

Patent Literature 2: Japanese Translation of PCT International Application Publication No. 2017-534101

SUMMARY OF INVENTION

Technical Problem

As described above, in conventional technologies, it has been difficult to quickly and accurately specify a target location by use of an unmanned aircraft and to accurately deliver a delivery object to the target location. First of all, this is because a position sensor that senses a flight position as in GPS has a very large error and hence it is extremely difficult to accurately specify the target location. Furthermore, it is considered that an exterior of the unmanned aircraft is monitored with a camera, and the target location is specified based on an image obtained from the camera, but it is difficult to reliably and accurately specify the target location from the image.

Solution to Problem

The present invention has been developed in view of problems described above, and has the following characteristics. That is, according to the present invention, provided is an unmanned aircraft including a cord having a predetermined position to which a specific mechanism having a predetermined function is attached, characterized by referring to a target location marker pattern representing an appearance of a target location marker disposed to have a predetermined relative position relationship with a target location, detecting an image portion corresponding to the target location marker from an image obtained by a camera that obtains the image below the unmanned aircraft, and guiding the unmanned aircraft directly above the target location based on the image portion.

In the present invention, the cord can be a tether including an extending/retracting mechanism. The present invention may have a configuration that extends the tether to an operating position where the specific mechanism is controlled to perform a specific operation, when a position of the unmanned aircraft is directly above the target location. The present invention may have a configuration that extends the tether to the operating position based on the image obtained by the camera.

The present invention may have a configuration where an attaching/detaching mechanism having a function of holding a delivery object operates as the specific mechanism to release the delivery object from the attaching/detaching mechanism at a release altitude that is the operating position, in the target location that is a position of a delivery destination of the delivery object. The present invention may have a configuration that further stores a delivery object marker pattern representing an appearance of a delivery object marker attached to an upper surface of the delivery object, refers to the delivery object marker pattern while the tether is extended, and guides the unmanned aircraft so that the delivery object is lowered down to the target location, based on an image portion of the delivery object marker that is included in the image obtained by the camera.

The present invention may have a configuration where the delivery object marker is a code pattern, and have a configuration that specifies a three-dimensional position of the delivery object based on a position and size of the image portion of the delivery object marker in the image obtained by the camera. The present invention may have a configuration where the release altitude is a ground altitude at which the delivery object is grounded, and the attaching/detaching mechanism includes an automatic release mechanism that releases the held delivery object, when the delivery object is grounded. The present invention may have a configuration that senses decrease in lift required to keep the unmanned aircraft at a constant ground altitude, to determine that the delivery object is released from the attaching/detaching mechanism.

The present invention may have a configuration where the release altitude is a ground altitude at which the delivery object is grounded, and a configuration that releases the attaching/detaching mechanism, when sensing that the delivery object is grounded. The present invention may have a configuration that senses decrease in lift required to keep the unmanned aircraft at a constant ground altitude, to determine that the delivery object is grounded. The present invention may have a configuration that detects a distance between the unmanned aircraft and the delivery object marker, based on a size of the image portion of the delivery object marker that is included in the image obtained by the camera. The present invention may have a configuration that releases the attaching/detaching mechanism when the delivery object is lowered down to the release altitude, based on the detected distance between the unmanned aircraft and the delivery object marker, and a ground altitude of the unmanned aircraft. In the present invention, the release altitude may be the ground altitude at which the delivery object is grounded. The present invention may have a configuration where the target location marker is a two-dimensional code pattern, and a configuration that specifies a three-dimensional relative position with the target location, based on a position and size of an image portion of the target location marker in the image obtained by the camera.

The present invention may be the unmanned aircraft having the above described characteristics, a method to be executed by the unmanned aircraft, a computer program that achieves the unmanned aircraft when executed by a computer, or a recording medium in which the program is stored.

Advantageous Effects of Invention

The present invention has a configuration of referring to a target location marker pattern representing an appearance of a target location marker disposed to have a predetermined relative position relationship with a target location, detecting an image portion corresponding to the target location marker from an image obtained by a camera that obtains the image below the unmanned aircraft, and guiding the unmanned aircraft directly above the target location based on the image portion. Consequently, the present invention has an effect of quickly and accurately specifying the target location by use of the unmanned aircraft, so that at the target location, a specific mechanism having a predetermined function can be operated.

In a case where the cord is a tether having an extending/retracting mechanism, the present invention has an effect that the specific mechanism can be operated with an arbitrary suspending length. In a case where the tether is extended to an operating position where the specific mechanism is controlled to perform a specific operation, when a position of the unmanned aircraft is directly above the target location, the present invention has an effect that the specific mechanism can be operated directly above the target location. In a case of extending the tether to the operating position based on the image obtained by the camera, the present invention has an effect that the extending of the tether can be controlled by using the camera for use to guide the aircraft to the target location.

According to the present invention, in a case where an attaching/detaching mechanism having a function of holding a delivery object operates as the specific mechanism to release the delivery object from the attaching/detaching mechanism at a release altitude that is the operating position, in the target location that is a position of a delivery destination of the delivery object, the invention has an effect that the delivery object can be moved to the delivery destination, and the delivery object can be released at an arbitrary release altitude. In a case of further storing a delivery object marker pattern representing an appearance of a delivery object marker attached to an upper surface of the delivery object, referring to the delivery object marker pattern while the tether is extended, and guiding the unmanned aircraft so that the delivery object is lowered down to the target location, based on an image portion of the delivery object marker that is included in the image obtained by the camera, the unmanned aircraft is prevented from being displaced from directly above the target location while the tether is extended. Consequently, the present invention has an effect that the delivery object can be accurately lowered down to the target location.

According to the present invention, in a case where the delivery object marker is a code pattern and in a case of specifying a three-dimensional position of the delivery object based on a position and size of the image portion of the delivery object marker in the image obtained by the camera, the invention has an effect that the three-dimensional position of the delivery object can be quickly and accurately specified based on a code shape of the delivery object marker. In the present invention, the release altitude is a ground altitude at which the delivery object is grounded and the attaching/detaching mechanism includes an automatic release mechanism that releases the held delivery object, when the delivery object is grounded. In this case, the delivery object can be released without giving any landing shock. In a case of sensing decrease in lift required to keep the unmanned aircraft at a constant ground altitude, to determine that the delivery object is released from the attaching/detaching mechanism, the present invention has an effect that the release of the delivery object can be detected without adding any special mechanism.

According to the present invention, in a case of detecting a distance between the unmanned aircraft and the delivery object marker, based on a size of the image portion of the delivery object marker that is included in the image obtained by the camera, the present invention has an effect that the distance from the delivery object can be quickly and accurately detected based on the code shape of the delivery object marker by use of the camera for use to guide the aircraft to the target location. In a case of releasing the attaching/detaching mechanism when the delivery object is lowered down to the release altitude, based on the detected distance between the unmanned aircraft and the delivery object marker, and a ground altitude of the unmanned aircraft, the present invention has an effect that the delivery object can be released at the accurate release altitude based on the detected ground altitude. According to the present invention, in a case where the target location marker is a two-dimensional code pattern and in a case of specifying a three-dimensional relative position with the target location, based on a position and size of the image portion of the target location marker in the image obtained by the camera, the invention has an effect that the three-dimensional posi-

BRIEF DESCRIPTION OF DRAWINGS

FIG. 12 is an image of the delivery object that is captured from the camera, the delivery object being suspended above the target location and lowered when the tether is extended in the delivery object release process (the altitude detection type) by the unmanned aircraft according to the embodiment of the present invention.

DESCRIPTION OF EMBODIMENT

Hereinafter, an unmanned aircraft 100 that is an embodiment of the present invention will be described with reference to the drawings. However, the present invention is not limited to a concrete aspect described below, and can various aspects in a scope of technical idea of the present invention. For example, the unmanned aircraft of the present invention is not limited to a multicopter shown in FIG. 1, may be any unmanned aircraft such as a rotorcraft or a fixed wing aircraft, and does not have to be an autonomous flight type of unmanned aircraft. Furthermore, a system configuration of the unmanned aircraft 100 is not limited to a shown configuration, and can be any configuration as long as a similar operation is possible. For example, a function of a communication circuit is integrated in a flight control unit. Thus, an operation to be executed by a plurality of components may be executed by a single component. Alternatively, for example, a function of a main computing unit is distributed to a plurality of computing units. Thus, an operation to be executed by a single component may be executed by a plurality of components. Furthermore, various data stored in a memory of the unmanned aircraft 100 may be stored in a separate place. For information to be recorded in respective memories, a type of information may be distributed and stored as a plurality of types of information, or a plurality of types of information may be stored collectively as a type of information.

DESCRIPTION OF TERMS

A "height" is a length in a vertical direction. An "altitude" means a height of a certain measurement point, and usually indicates a height from sea surface (above sea level). A "ground altitude" is a height from a ground surface. A "flight altitude" is a flying height, but is represented by the ground altitude. A "release altitude" is a ground altitude at which a delivery object or the like is released from an attaching/detaching mechanism.

Appearance Configuration of Unmanned Aircraft

Figure 1:
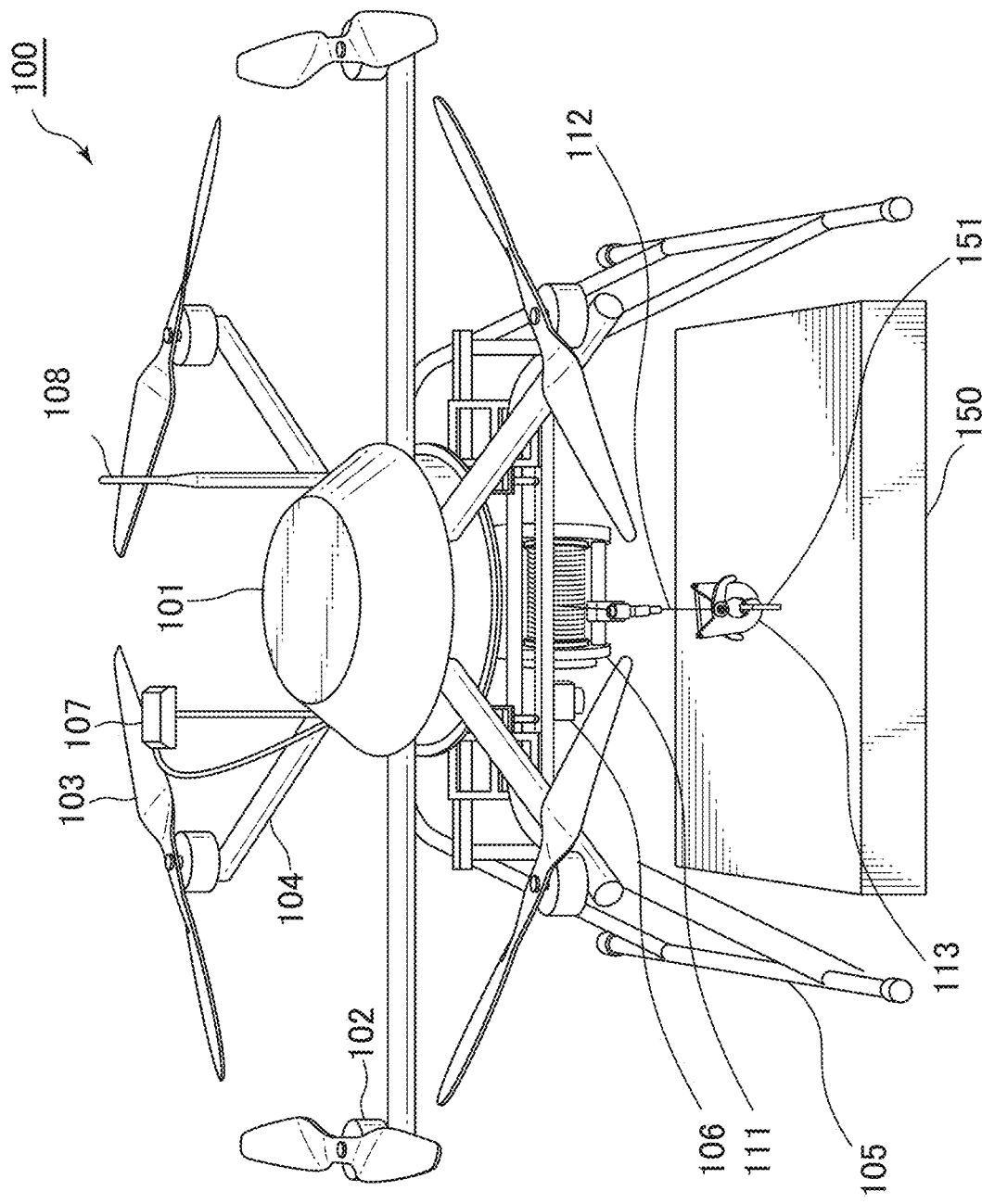
FIG. 1 is an appearance view of a multicopter that is an example of an unmanned aircraft according to an embodiment of the present invention.

FIG. 1 is an appearance view of a multicopter that is an example of the unmanned aircraft (multicopter) 100 according to the present invention. The unmanned aircraft 100 comprises, in its appearance, a control unit 101, six motors 102 to be driven in response to a control signal from the control unit 101, six rotors (rotary wings) 103 that are driven by the respective motors 102 to rotate and generate lift, six arms 104 connecting the control unit 101 to the respective motors 102, and landing legs 105 that support the unmanned aircraft during landing. Each of numbers of the motors 102, the rotors 103 and the arms 104 may be three or more, such as three or four. The control signal from the control unit 101 causes the six motors 102 to rotate. Consequently, a number of rotations of each of the six rotors 103 is controlled, to control flight of the unmanned aircraft 100, such as rising, lowering, flight back and forth and left and right, or turning. Furthermore, a tether extending/retracting mechanism 111 is attached to an appropriate position of a main body lower part of the unmanned aircraft 100, the mechanism including a camera 106 that obtains an image below the unmanned aircraft 100, and a winch being rotatable in a forward and backward direction and capable of winding a tether 112 so that a length of a hanging part of the tether is a predetermined length. Additionally, the unmanned aircraft 100 also includes a flight position sensor 107 and an antenna 108. An attaching/detaching mechanism 113 to hold an object to be held is attached to a predetermined portion such as a tip of the tether 112. A specific mechanism having a predetermined function, that is not limited to the attaching/detaching mechanism 113, may be attached to the predetermined portion of the tether 112. Preferably, the specific mechanism performs a specific operation, when the unmanned aircraft 100 comes directly above a target location, preferably when the specific mechanism is further lowered to a specific operating position. As the specific mechanism, a mechanism that performs any type of operation may be used. For example, as the specific mechanism, any type of sensor, a camera, any type of tool or the like may be used. The specific mechanism may be configured to sense itself that the mechanism comes directly above the target location and to perform the specific operation, or may be configured to perform the specific operation in response to the control signal from the control unit 101 that senses a position of the unmanned aircraft 100 or the specific mechanism. Note that in place of the extendable and retractable tether 112, a member such as a cord having a fixed length, and the specific mechanism may be attached to a predetermined portion of the cord.

Figure 2:
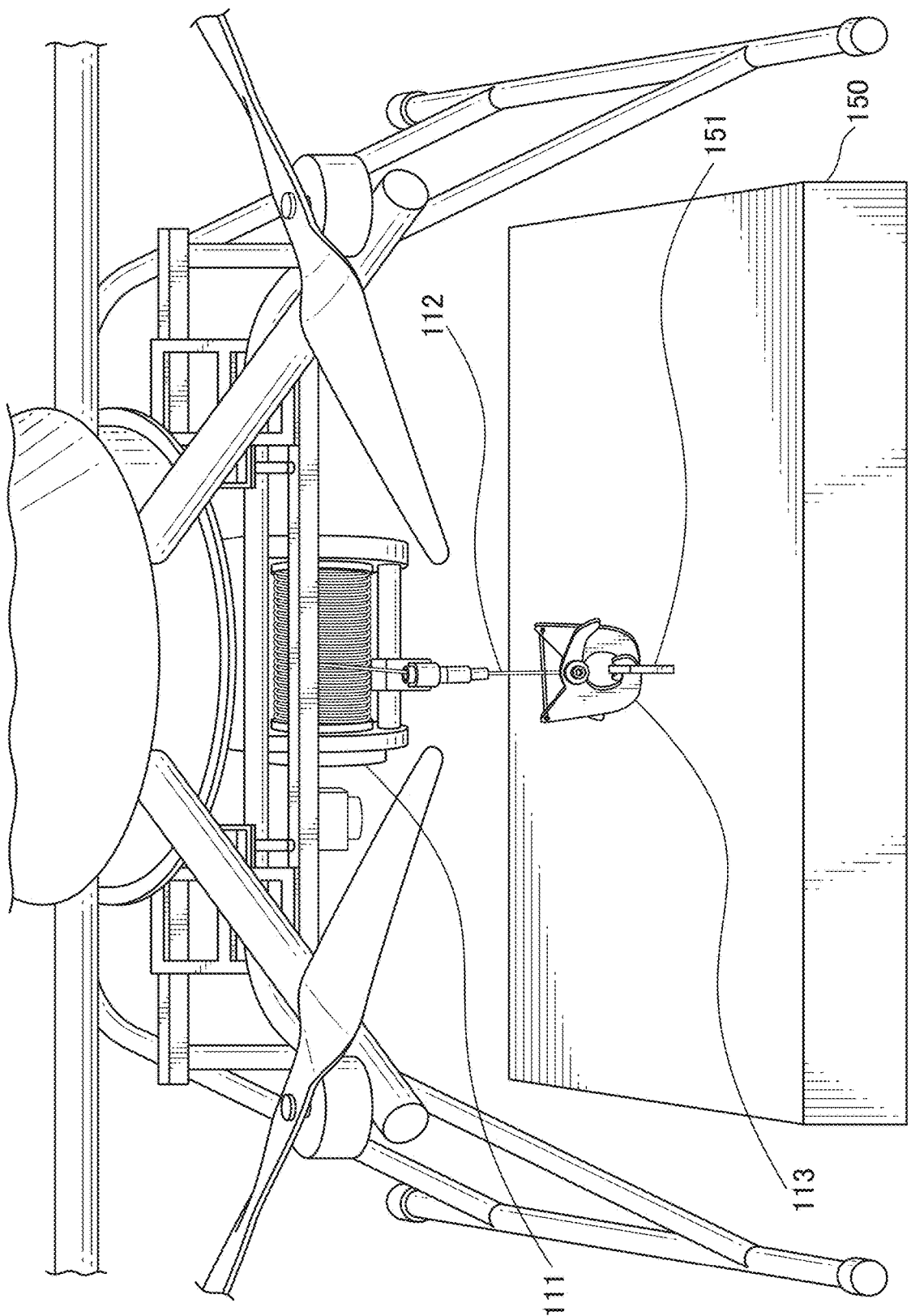
FIG. 2 is an appearance view of the multicopter that is the example of the unmanned aircraft according to the embodiment of the present invention, in which a tether and a surrounding part of the tether are enlarged.

FIG. 1 and FIG. 2 show a state where a hook receptacle 151 that is not a component of the unmanned aircraft 100 is attached to an upper surface of a delivery object 150 and the delivery object is held by the attaching/detaching mechanism 113. In the drawing, the attaching/detaching mechanism 113 attached to the tip of the tether 112 holds the delivery object via the hook receptacle 151. The hook receptacle 151 is a structure that can be hooked with a hook, and is, for example, an annular structure. The attaching/detaching mechanism 113 may be attached to a portion of the tether 112 other than the tip thereof. The attaching/detaching mechanism 113 is a mechanism that releasably holds the object to be held, such as the delivery object 150, and is typically a hook mechanism that can sandwich, hook or release the object. The hook mechanism may comprise a passive automatic release mechanism that automatically releases the delivery object 150 held by the hook mechanism in a case where a load comes off, for example, because the delivery object is grounded. A hook mechanism shown as a specific example of the attaching/detaching mechanism 113 of FIG. 2 includes an automatic release mechanism comprising a configuration of rotatably fixing two opposite hooking members to each other via a shaft and applying tension to upper parts of the members in a direction to release the hooking members, with an elastic member such as rubber. A tip of each hooking member is provided with a lock mechanism comprising an upward protrusion. When the hooking members cross to extend through and sandwich an annular portion of the hook receptacle 151 of the delivery object 150, the hook receptacle 151 inhibits movement of the protrusion to prevent the hooking members from moving in the release direction. Consequently, the attaching/detaching mechanism 113 is locked in a state where the delivery object 150 is held. If, for example, the delivery object 150 is grounded and the load comes off, the hook receptacle 151 moves upward, the protrusion can move, and the hooking members move in the release direction to release the delivery object 150. Alternatively, the attaching/detaching mechanism 113 includes an active lock mechanism to be driven with a solenoid or the like, and the delivery object 150 may be releasably locked in a state of being held by the attaching/detaching mechanism 113. In this case, the solenoid of the attaching/detaching mechanism 113 is connected to the unmanned aircraft 100 via a conductor. If an electric signal to drive the solenoid is transmitted from the control unit 101 through the conductor, the lock mechanism of the attaching/detaching mechanism 113 that holds the delivery object 150 is released, to release the delivery object 150.

Configuration of Unmanned Aircraft

Figure 3:
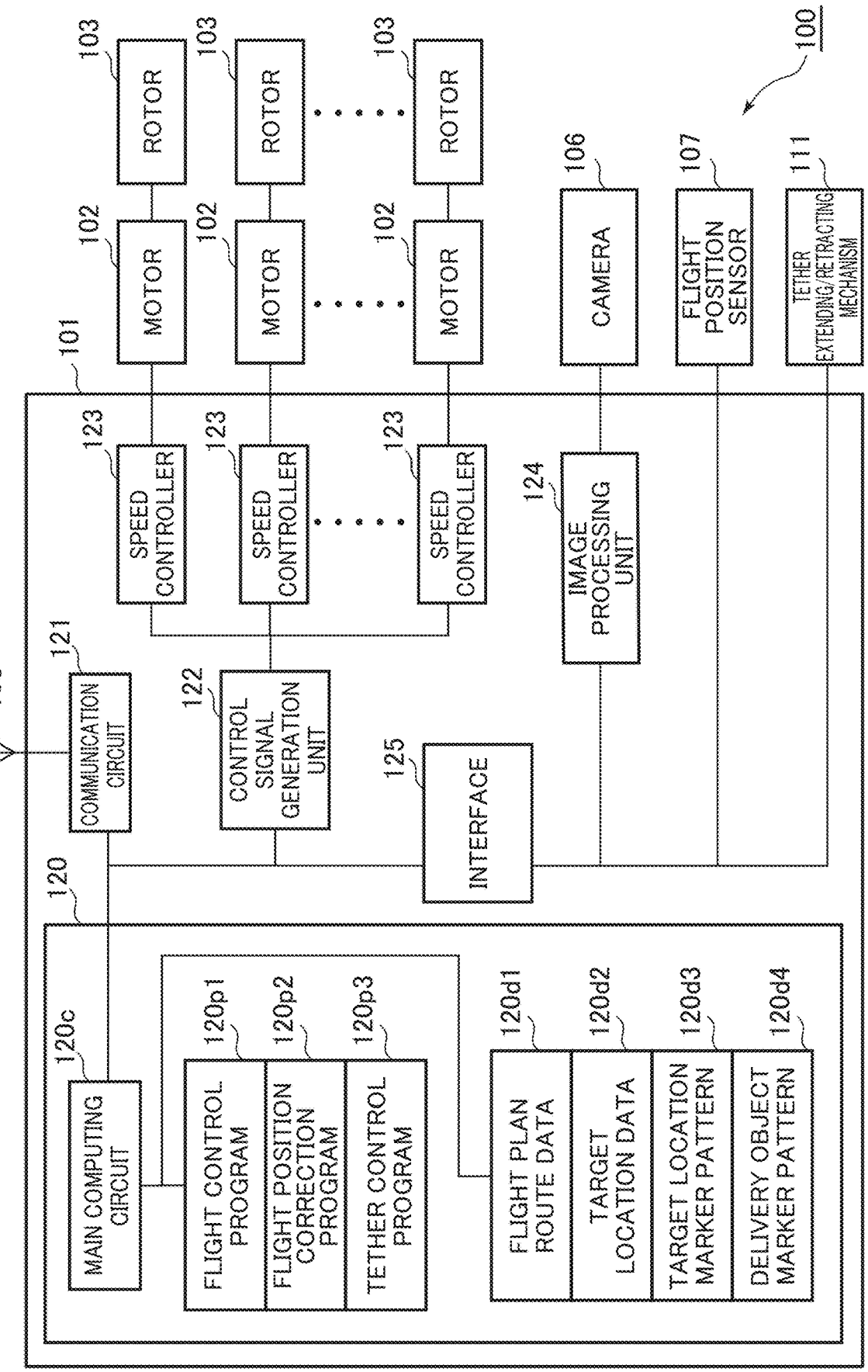
FIG. 3 is a block diagram showing a configuration of the unmanned aircraft according to the embodiment of the present invention.

FIG. 3 is a block diagram showing a configuration of the unmanned aircraft 100 shown in FIG. 1. The unmanned aircraft 100 is roughly composed of the control unit 101, the motors 102 electrically connected to the control unit 101, the rotors 103 mechanically connected to the motors 102, the camera 106, the flight position sensor 107, the antenna 108, and the tether extending/retracting mechanism 111. The control unit 101 is a unit configured to process information to perform flight of the unmanned aircraft 100 and flight control as well as a delivery process of the delivery object 150, or to control the electric signal for the process, and the unit typically forms a circuit in which various electronic components are arranged and wired on a substrate to achieve such a function. The control unit 101 is further composed of an information processing unit 120, a communication circuit 121, a control signal generation unit 122, speed controllers 123, an image processing unit 124, and an interface 125.

The camera 106 is a camera attached to the appropriate position of the lower part of the unmanned aircraft 100 to shoot a video. The camera 106 obtains data of an image in a shooting range. The image is typically an image of a video picture comprising a series of still images. The obtained image data is processed by the image processing unit 124, and an object and pattern that are reflected in the image are recognized. The flight position sensor 107 is a sensor for navigation that senses a coordinate of a flight position of the unmanned aircraft 100 as in a global positioning system (GPS) sensor. The flight position sensor 107 preferably senses a three-dimensional coordinate. The flight position sensor 107 is mainly for use to control a position of the unmanned aircraft 100 during the flight along a flight plan route.

Note that although not shown in the drawings, the unmanned aircraft 100 also includes various basic sensors for the flight control of controlling the flight of the unmanned aircraft 100, for example, a posture sensor such as a 6-axis gyro (an acceleration/angular velocity sensor), an azimuth sensor such as a magnetic sensor, and an altitude sensor such as a barometric pressure sensor. The posture sensor is a sensor to detect movement, tilt and the like of the unmanned aircraft 100, and is for use to control a posture of the unmanned aircraft 100 during the flight. The azimuth sensor is for use to control a flight direction. The altitude sensor is a sensor that detects an altitude of the unmanned aircraft 100, and is for use to control a flight altitude of the unmanned aircraft 100. The unmanned aircraft 100 may comprise a distance sensor such as an ultrasonic sensor. The distance sensor may be used to measure a distance between an obstacle and ground, avoid collision with the obstacle, and precisely measures a ground altitude. The antenna 108 is an aerial line to receive a radio signal including information or various data to maneuver and control the unmanned aircraft 100, and to transmit the radio signal including a telemetry signal from the unmanned aircraft 100.

The tether extending/retracting mechanism 111 is a configuration such as the winch that winds the tether 112, and is controlled so that the winch can be rotated as much as a predetermined rotation amount in a predetermined rotating direction. The tether extending/retracting mechanism 111 can adjust the length of the hanging part of the tether 112 to a predetermined amount. The tether extending/retracting mechanism 111 receives an instruction signal from the control unit 101 which indicates a rotation on/off state and the rotating direction, drives the winch in the indicated rotating direction with power of the motor, or the like, based on the signal, and picks up and winds the tether 112 to adjust the length of the tether 112.

The information processing unit 120 includes a main computing circuit 120c composed of a processor, a temporary memory and others to perform various computations and flow control, and a memory (not shown), and in the memory, stored are programs such as a flight control program 120p1, a flight position correction program 120p2 and a tether control program 120p3 and data such as flight plan route data 120d1, target location data 120d2, a target location marker pattern 120d3 and a delivery object marker pattern 120*d*4. Specifically, the memory is preferably a nonvolatile memory such as a flash memory or a backup RAM memory.

The communication circuit 121 is an electronic circuit to generate, from the radio signal received through the antenna 108, the radio signal that carries, for example, the telemetry signal to be input into the main computing circuit 120*c* or output from the unmanned aircraft 100, by demodulating a maneuver signal for the unmanned aircraft 100, the control signal and the respective data, and the circuit is typically a radio signal processing IC. Note that communication of the maneuver signal and communication of the control signal and the respective data may be executed in separate communication circuits being different in frequency band. For example, it is possible to employ a configuration that communicates with a transmitter (propo) of a controller to perform manual maneuver at a frequency of a 950 MHz band, and that performs data communication at a frequency of 2 GHz band/1.7 GHz band/1.5 GHz band/800 MHz band.

The control signal generation unit 122 is configured to convert control command value data obtained by computation by the main computing circuit 120*c* into a pulse signal (a PWM signal or the like) representing a voltage, and is typically an IC including an oscillation circuit and a switching circuit. The speed controller 123 is configured to convert the pulse signal from the control signal generation unit 122 into a drive voltage to drive the motors 102, and typically comprises a smoothing circuit and an analog amplifier. Although not shown in the drawings, the unmanned aircraft 100 comprises a power source system including a power distribution system to a battery device such as a lithium polymer battery or a lithium ion battery and to respective elements.

The image processing unit 124 is configured to recognize the image based on image data obtained from the camera 106 and perform position determination, classification, measurement or the like of the object in the image, and is typically a unit composed of a processor, a temporary memory, a ROM that stores the programs and others to perform image processing. The image processing unit 124 is combined with the camera 106 to form a machine vision.

The interface 125 is configured to convert a signal form so that the signal can be transmitted and received among the main computing circuit 120*c*, and functional elements such as the image processing unit 124, the tether extending/retracting mechanism 111 and the flight position sensor 107, thereby electrically connecting these components. Note that for convenience of explanation, the interface is shown as one configuration in the drawing, but it is usual to use separate interfaces in accordance with types of functional elements of connection targets. Furthermore, the interface 125 may be unnecessary depending on a type of signal to be input and output by each of the functional elements of the connection targets. Furthermore, in FIG. 3, even the information processing unit 120 connected without the interface 125 may require the interface depending on the type of signal to be input or output by the functional element of the connection target.

The flight control program 120*p*1 is a program that achieves a function of a flight controller that controls flight of a drone, and is a program to appropriately control the flight of the unmanned aircraft 100 based on the maneuver signal (during non-autonomous flight), the flight plan route (during autonomous flight) or the like from an operator. Specifically, the flight control program 120*p*1 is the program to determine the posture, a speed or the like of the unmanned aircraft 100 by information obtained from the respective sensors for the flight control, determine a current flight position of the unmanned aircraft 100 by information obtained from the flight position sensor 107, compare the maneuver signal, the flight plan route, a speed limitation, an altitude limitation or the like with each target value, calculate a control command value to each rotor 103 in the main computing circuit 120*c*, and output data indicating the control command value to the control signal generation unit 122. The control signal generation unit 122 converts the control command value into the pulse signal representing the voltage to transmit the signal to each speed controller 123. Each speed controller 123 converts the pulse signal into the drive voltage to apply the voltage to each motor 102. This controls drive of each motor 102 to control the number of rotations of each rotor 103, and the flight of the unmanned aircraft 100 is accordingly controlled. The flight position correction program 120*p*2 is a program to correct flight position data based on the information obtained from the flight position sensor 107, based on an image recognition result obtained when the image processing unit 124 recognizes the image obtained by the camera 106. The tether control program 120*p*3 is a program to control the tether extending/retracting mechanism 111 to extend and retract the tether 112. The tether extending/retracting mechanism 111 typically extends the tether 112 to a position where a specific mechanism such as the attaching/detaching mechanism 113 is operated. The specific mechanism is operated to stop extending the tether 112 and house the tether 112.

The flight plan route data 120*d*1 is data representing a three-dimensional (latitude, longitude, and altitude) flight plan route of the unmanned aircraft 100, and is typically data of a set of series of waypoints that are present on the flight plan route. The flight plan route is typically a set of straight lines connecting the plurality of waypoints in order, and may be curved lines at a predetermined curvature in a predetermined range of the waypoints. Preferably, the target location may be present in a vicinity of a specific waypoint of the flight plan route. Information to the effect that the aircraft passes through the waypoint and flies toward the target location is added to the waypoint. The waypoint can be an end point (a turning point) of the flight plan route. Note that a certain waypoint can be the target location. In this case, information to the effect that the waypoint is the target location is added to data of the waypoint. The flight plan route data 120*d*1 may include data that determines a flight speed in the plurality of waypoints. The flight plan route data 120*d*1 is typically for use to determine the flight plan route in the autonomous flight, but may be used for guide during the flight in the non-autonomous flight. The flight plan route data 120*d*1 is typically input and stored in the unmanned aircraft 100 prior to the flight.

The target location data 120*d*2 is data representing coordinate information of the target location that is a position to operate the specific mechanism, such as the attaching/detaching mechanism 113. As the coordinate, the latitude, the longitude or the like is typically used, but another type of information may be used. Furthermore, it is preferable that the target location data 120*d*2 includes information of the altitude. The target location data 120*d*2 is typically coordinate data of a delivery location that is a destination of delivery of the delivery object 150. The target location data 120*d*2 can include data of a plurality of target locations. Additionally, as described above, the target location determined by the target location data 120*d*2 can be incorporated and stored as the waypoint in the flight plan route data 120*d*1.

The target location marker pattern 120d3 is data representing an appearance of a target location marker 161 disposed to have a predetermined relative position relationship with the target location. The target location marker 161 is a marker having a pattern so that the target location can be reliably visually specified, and paper, cloth or the like including the marker printed thereon is disposed in a vicinity of the target location. The data of the target location marker 161 can be image data (e.g., an image of JPEG format), or can be a code (e.g., a numeric string with which a two-dimensional code can be generated) in a case where the target location marker 161 is a code pattern. Furthermore, the target location marker pattern 120d3 also includes information of a size of the target location marker 161. As the target location marker 161, the two-dimensional code, such as QR code (registered trademark), is typical, but a one-dimensional code such as a barcode, a symbolic figure or the like may be used. If the target location marker 161 is a combination of a plurality of patterns having various sizes, position measurement accuracy can improve. Furthermore, the whole target location marker 161 or each portion in the marker may have a specific color, and the target location marker pattern 120d3 may include such color information. The target location marker 161 is disposed to have the predetermined relative position relationship with the target location (e.g., located 500 mm north and 200 mm east, located to surround the target location, or the like). The relative position relationship is associated and stored with the target location marker pattern 120d3. If a position of the target location marker 161 is specified, a value of the relative position relationship is used, and hence the position of the target location can be specified. Furthermore, the target location marker 161 has a predetermined size and shape (e.g., a square of 220 mm×220 mm). In a case where an image portion of the target location marker 161 is present in the image obtained by the camera 106, a distance to the target location marker 161 can be calculated by specifying a size of the image portion. Furthermore, a position of the image portion of the target location marker 161 in the image obtained by the camera 106 is specified, so that a direction of the target location marker 161 can be specified. The target location marker pattern 120d3 is typically read by the main computing circuit 120c and sent to the image processing unit 124, and is used for image recognition in the image processing unit 124. The target location marker pattern 120d3 may be stored in the image processing unit 124.

The target location data 120d2 is associated and stored with the target location marker pattern 120d3 representing the appearance of the target location marker 161 disposed in the data. In a case where the target location data 120d2 includes the data of the plurality of target locations, the target location marker pattern 120d3 includes data representing appearances of a plurality of target location markers 161 associated with the plurality of target locations, respectively. In this case, the relative position relationship between the target location marker 161 and the target location can be a relative position relationship that differs with each of different target locations.

The delivery object marker pattern 120d4 is data representing an appearance of a delivery object marker 162 disposed on the upper surface of the delivery object 150. The data can be image data (e.g., the image of JPEG format), or can be a code (e.g., the numeric string with which the two-dimensional code can be generated) in the case where the target location marker 161 is the code pattern. Furthermore, the delivery object marker pattern 120d4 also includes information of a size of the delivery object marker 162. The delivery object marker 162 is a marker having a pattern so that a three-dimensional position of the delivery object 150 can be reliably visually specified, and paper or the like including the marker printed thereon is attached to the upper surface of the delivery object 150. As the delivery object marker 162, the two-dimensional code, such as QR code (registered trademark), is typical, and the one-dimensional code, such as the barcode, the symbolic figure or the like may be used. If the delivery object marker 162 is a combination of a plurality of patterns having various sizes, the position measurement accuracy can improve. Furthermore, the whole delivery object marker 162 or each portion in the marker may have a specific color, and the delivery object marker pattern 120d4 may include such color information. The delivery object marker 162 is typically disposed in a center of the upper surface of the delivery object 150, and can be disposed at a predetermined relative position from the center. If a position of the delivery object marker 162 is specified, the position of the delivery object 150 can be specified. Additionally, the delivery object marker 162 has a predetermined size and shape (e.g., a square of 220 mm×220 mm). In a case where an image portion of the delivery object marker 162 is present in the image obtained by the camera 106, a distance to the delivery object marker 162 can be calculated by specifying a size of the image portion. Furthermore, a position of the image portion of the delivery object marker 162 in the image obtained by the camera 106 is specified, so that a direction of the delivery object marker 162 can be specified. The delivery object marker pattern 120d4 is typically read by the main computing circuit 120c and sent to the image processing unit 124, for use in the image recognition by the image processing unit 124.

Functional Configuration of Unmanned Aircraft

Figure 4:
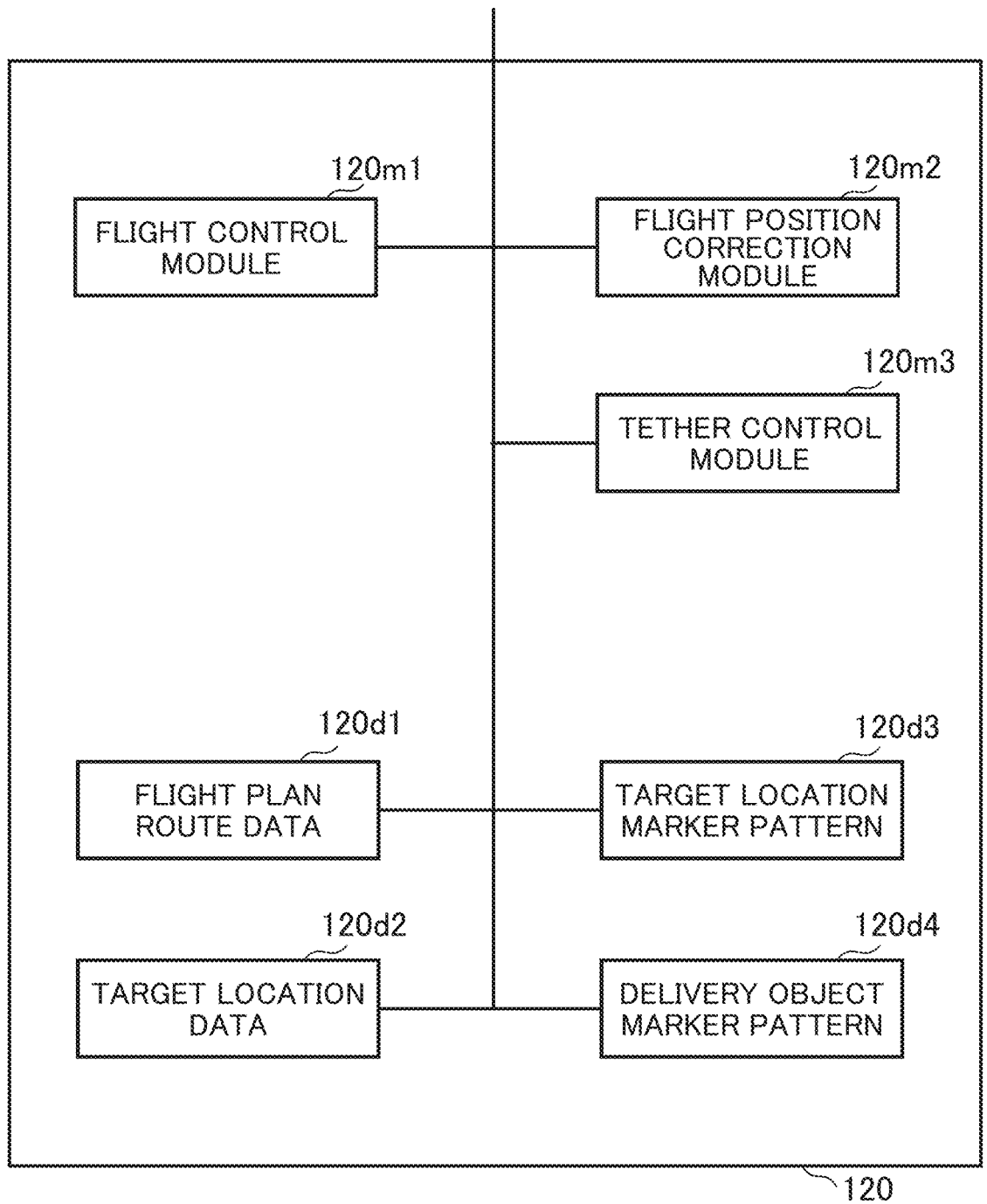
FIG. 4 is a functional block diagram showing a functional configuration of the unmanned aircraft according to the embodiment of the present invention.

FIG. 4 is a functional block diagram showing a functional configuration of the information processing unit 120 included in the unmanned aircraft 100. FIG. 4 shows a configuration of a function module implemented by software in a control unit of the unmanned aircraft 100. In the information processing unit 120, from a functional perspective, modules such as a flight control module 120m1, a flight position correction module 120m2 and a tether control module 120m3 are accessibly connected to data such as the flight plan route data 120d1, the target location data 120d2, the target location marker pattern 120d3, and the delivery object marker pattern 120d4. The flight control module 120m1 is a module that functions when the main computing circuit 120c executes the flight control program 120p1 while referring to the flight plan route data 120d1 as required. The flight position correction module 120m2 is a module that functions when the main computing circuit 120c executes the flight position correction program 120p2 while referring to the flight plan route data 120d1 and the target location marker pattern 120d3 as required. The tether control module 120m3 is a module that functions when the main computing circuit 120c executes the tether control program 120p3 while referring to the target location marker pattern 120d3 and the delivery object marker pattern 120d4 as required. The functions of the respective module will be described in operation description.

Delivery Object Delivery Process of Unmanned Aircraft 100

A typical delivery object delivery process of the unmanned aircraft 100 is as follows. The unmanned aircraft 100 departs from a departure position in a state of holding the delivery object 150 with the attaching/detaching mechanism 113 of the tether 112, and autonomously flies along the flight plan route. Then, the unmanned aircraft 100 stops at the target location that is present on the flight plan route to hover at a constant ground altitude, extends the tether 112 to lower the delivery object 150 down to a release position of the attaching/detaching mechanism 113, and releases the delivery object 150 there, to deliver the delivery object 150 to the target location. Note that it is preferable that, after delivering the delivery object 150, the unmanned aircraft 100 winds and houses the tether 112, and shortens the length of the hanging part. The winch of the tether extending/retracting mechanism 111 includes a press switch that operates when pressed in a case where the tether 112 is wound up to the attaching/detaching mechanism 113 near the tip of the tether, and upon the operation of the press switch the winch stops winding the tether 112. Furthermore, after delivering the delivery object 150, the unmanned aircraft 100 can be controlled to return to the departure position along the predetermined flight plan route. Hereinafter, an operation flow of the delivery object delivery process will be described.

Figure 5:
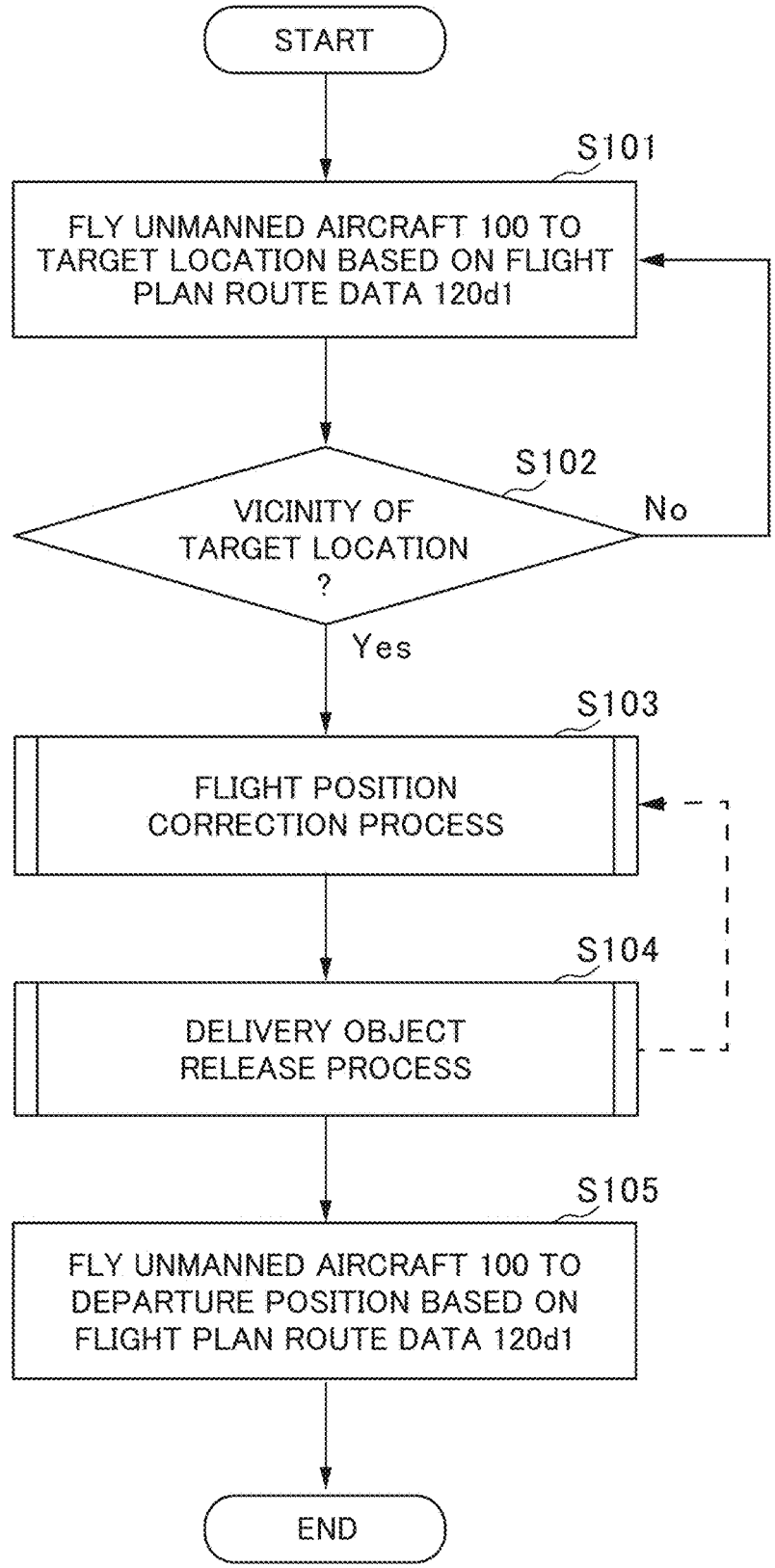
FIG. 5 is an operation flowchart of a delivery object delivery process by the unmanned aircraft according to the embodiment of the present invention.

FIG. 5 is an operation flowchart of the delivery object delivery process by the unmanned aircraft 100. Advance preparation prior to the flight includes preparing an appropriate flight plan route, and storing the set of series of waypoints that are present on the flight plan route as the flight plan route data 120d1 in the unmanned aircraft 100. The flight plan route data 120d1 can include information of the altitude or the ground altitude in each of the waypoints. Furthermore, the coordinate data of the target location to which the delivery object is to be delivered, or the like is stored as the target location data 120d2 in the unmanned aircraft 100. Note that the target location can be treated as the waypoint. In this case, the flight plan route data 120d1 is a mixture of the waypoint that is the target location, and the waypoint representing not the target location but a passage position. It is preferable that, when storing the flight plan route data 120d1 and the target location data 120d2 in the unmanned aircraft 100, these data are transmitted to the unmanned aircraft 100 with the radio signal, and are read by the information processing unit 120 via the antenna 108 and the communication circuit 121. In a case where the unmanned aircraft 100 includes another appropriate interface, the data may be read by the information processing unit 120 of the unmanned aircraft 100 via the interface.

Upon completion of the advance preparation prior to the flight, an autonomous flight control function is executed along the flight plan route by the flight control module 120m1. That is, the flight control module 120m1 reads the flight plan route data 120d1, and controls the unmanned aircraft 100 to fly to the target location along the flight plan route determined by the data (step S101). Specifically, the module controls the flight direction and altitude of the unmanned aircraft 100 so that the aircraft flies via the waypoints in order as determined by the flight plan route data 120d1. The flight plan route data 120d1 preferably includes data of a targeted flight speed, and the unmanned aircraft 100 is controlled to fly along the flight plan route at the flight speed. The flight control module 120m1 may receive a manual operation from a user to execute the non-autonomous flight during the flight. In this case, the flight plan route is used for the guide, and the unmanned aircraft 100 can be returned onto the flight plan route, for example, at the end of the manual operation.

The flight control module 120m1 reads the target location data 120d2, and determines whether a current flight position reaches the vicinity of the target location (step S102). Specifically, in the waypoints determined by the flight plan route data 120d1, when the waypoint toward the target location after passage is reached or when a vicinity of the waypoint (within a predetermined distance) is reached, it is determined that the flight position reaches the vicinity of the target location. Note that in a case where the target location is included in the waypoints and in a case where the vicinity of the waypoint (within the predetermined distance) is reached, it is determined that the vicinity of the target location is reached. Next, when the current flight position reaches the vicinity of the target location, the flight position correction module 120m2 executes a flight position correction process (step S103). In a case where the current flight position is not in the vicinity of the target location in the step S102, the process returns to the step S101, where the unmanned aircraft 100 continuously flies based on the flight plan route data 120d1. The flight position correction process is a process of decreasing an error (about several meters) included in the flight position data obtained from the flight position sensor 107 that is typically a GPS receiver, based on the image recognition result obtained when the image obtained by the camera 106 is recognized by the image processing unit 124, and thereby correcting the flight position data into a more accurate value. The flight position data is corrected into the more accurate value, and the unmanned aircraft 100 is accordingly accurately guided directly above the target location. Furthermore, without correcting the flight position data, the unmanned aircraft 100 can be accurately guided directly above the target location based only on the image recognition result obtained when the image obtained by the camera 106 is recognized by the image processing unit 124. In this case, the flight position data based on the flight position sensor 107 when the aircraft is accurately guided directly above the target location remains displaced as much as an amount of error. A detailed operation of the flight position correction process will be described later. By the flight position correction process, the unmanned aircraft 100 is guided directly above the target location, where the aircraft hovers. Next, in a case where the current flight position reaches the target location, a delivery object release process is executed (step S104). In the delivery object release process, typically the tether 112 is extended to lower the delivery object 150 down to the release altitude, and then the delivery object is released from the attaching/detaching mechanism 113 and delivered to the target location. In the delivery object release process, the extending of the tether 112 can be combined with a process of lowering the unmanned aircraft 100. Note that it is preferable that the flight position correction process (the step S103) remains continuously executed even if the delivery object release process is started. Thus, the unmanned aircraft 100 stays directly above the target location also during the execution of the delivery object release process, and the delivery object 150 can be accordingly delivered accurately to the target location. A detailed operation of the delivery object release process will be described later. Furthermore, preferably, at the end of the delivery object release process, the flight control module 120m1 reads the flight plan route data 120d1, and accordingly controls the unmanned aircraft 100 to fly to the departure position along the determined flight plan route as determined by the data (step S105). The flight plan route data 120d1 may be data of a series of routes to return from the departure position via the target location to the departure position. Additionally, the flight plan route data 120d1 may be data of a route of one way from the departure position to the target location, and in this case, the unmanned aircraft 100 reaches the target location and then follows the one-way route in reverse to return to the departure position.

Figure 6:
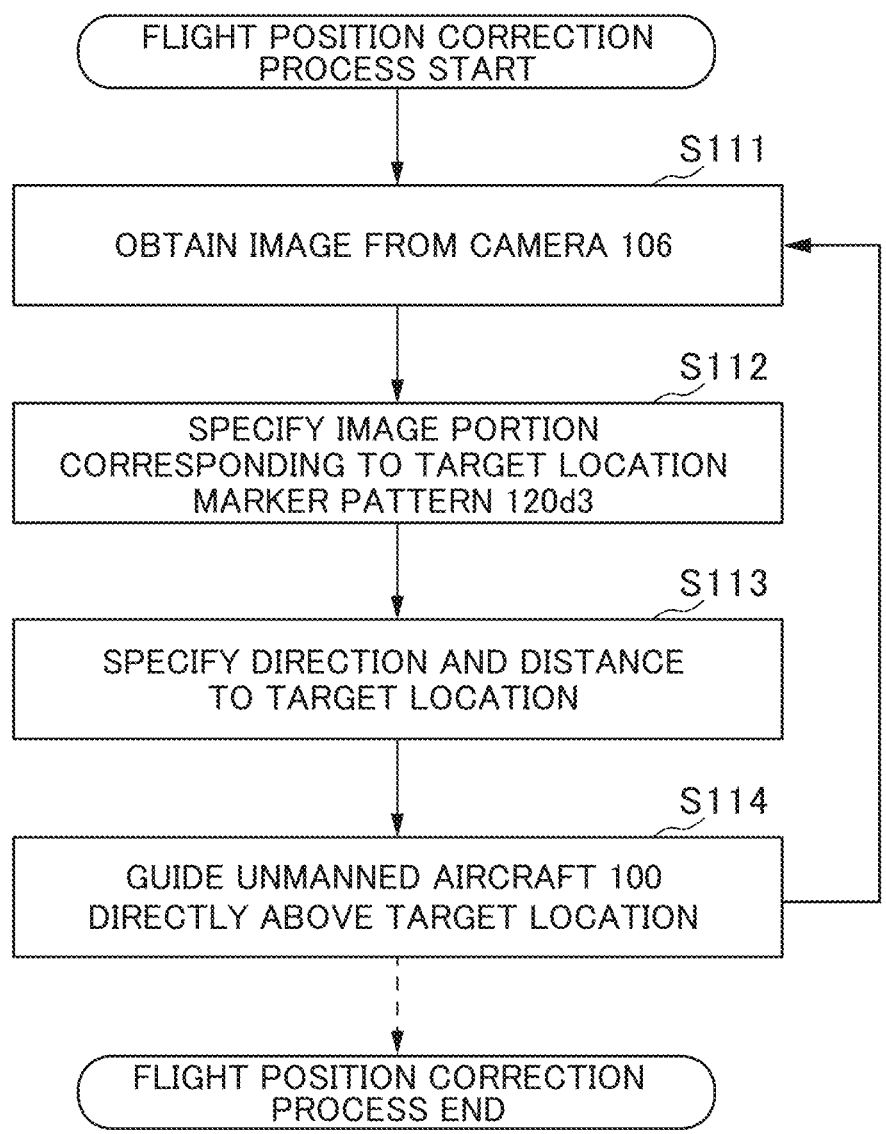
FIG. 6 is an operation flowchart of a flight position correction process by the unmanned aircraft according to the embodiment of the present invention.

(Flight Position Correction Process) Hereinafter, a detailed process of the flight position correction process will be described. FIG. 6 is an operation flowchart of the flight position correction process by the unmanned aircraft 100. During the flight, the camera 106 shoots the video in the shooting range having a center on a lower side, preferably in a directly lower direction. The image processing unit 124 recognizes the image obtained by the camera 106 to generate the image recognition result, and the information processing unit 120 obtains the result. Furthermore, the flight position sensor 107, such as GPS receiver, obtains information of the flight position or the like, and sends the information to the information processing unit 120. Consequently, the respective modules in the information processing unit 120 can use the image recognition result and the flight position data. The image processing unit 124 can refer to the target location marker pattern 120*d*3, to specify the image portion of the target location marker 161. First, the image processing unit 124 obtains image data from the camera 106 (step S111). The image processing unit 124 searches the obtained image for the image portion corresponding to the target location marker pattern 120*d*3, and specifies the image portion (step S112). For the recognition of the image portion, known image recognition technology may be used. The flight position correction module 120*m*2 specifies a direction and distance to the target location based on the image recognition result (step S113). Specifically, the module obtains the distance between the unmanned aircraft 100 and the target location marker 161 based on the information of the size of the image portion of the target location marker 161 and the size of the target location marker 161, and obtains the direction to the target location marker 161 based on the position of the image portion in the whole obtained image. For example, in a case where the camera 106 uses a direct lower side as a center of the shooting range and if the image portion is at the center in the whole image obtained from the camera 106, it is considered that the target location marker 161 is directly below the camera 106. Furthermore, since the size of the actual target location marker 161 is known, it is possible to obtain a relationship between the size of the target location marker 161 in the image (or a size of an image on an imaging element) and the distance from the target location marker 161 to the camera 106, in a case where the appearance of the marker is converted into image data by the camera 106 including a lens having a predetermined focal length and including the imaging element having a predetermined size and resolution. By use of this relationship, if the size of the image portion corresponding to the target location marker 161 in the image is specified, the distance between the target location marker 161 and the camera 106 can be obtained. Note that depending on characteristics of the lens, a position of the image portion corresponding to the target location marker 161 in the image may be related. Therefore, in this case, the distance between the target location marker 161 and the camera 106 can be more accurately obtained in consideration of the position in the image.

By the above described process, first, a three-dimensional relative position between the target location marker 161 and the unmanned aircraft 100 is specified. Here, in a case where the camera 106 is displaced from a place where the center of the unmanned aircraft 100 and/or the tether 112 hangs from the unmanned aircraft 100 as much as a certain distance in a certain direction, it is preferable to specify the three-dimensional relative position between the target location marker 161 and the unmanned aircraft 100 in consideration of the displacement. Then, the target location marker 161 is disposed to have the predetermined relative position relationship with the target location, and hence the position of the specified target location marker 161 is offset by the relative position relationship. Consequently, the relative position between the unmanned aircraft 100 and the target location is specified. Note that in a case where the image processing unit 124 is highly functional, the image processing unit 124 can execute at least a part of the operation of the step S113.

Next, the flight position correction module 120*m*2 accurately guides the unmanned aircraft 100 directly above the target location (step S114). Specifically, the flight position correction module 120*m*2 issues an instruction to the flight control module 120*m*1 so that the unmanned aircraft 100 flies toward a position directly above the specified target location. This instruction can be made by correcting the flight position data obtained by the flight position sensor 107 into a more accurate value by use of the relative position between the unmanned aircraft 100 and the target location that is obtained by use of the image of the target location marker 161. That is, if the unmanned aircraft 100 is guided directly above the target location and the flight position data is corrected into the accurate value, the unmanned aircraft 100 is accurately guided directly above the target location.

Furthermore, the unmanned aircraft 100 can be accurately guided directly above the target location without correcting the flight position data. This can be achieved by issuing an instruction from the flight position correction module 120*m*2 to the flight control module 120*m*1 so that the unmanned aircraft 100 moves to a position where the displacement of the relative position between the unmanned aircraft and the target location in a horizontal direction is canceled. Specifically, the flight position correction module 120*m*2 issues an instruction to the flight control module 120*m*1 to move as much as the distance of the displacement in a direction opposite to a displacement direction. In this case, the flight position data based on the flight position sensor 107 when the aircraft is accurately guided directly above the target location remains displaced as much as the amount of error.

The flight control module 120*m*1 controls the individual numbers of rotations of the rotors 103 so that the unmanned aircraft 100 moves to the position directly above the accurately specified target location, to tilt the unmanned aircraft 100 in an advancing direction and move the aircraft in the direction. Note that it is possible that, also after the unmanned aircraft 100 comes directly above the target location, the flight position correction module 120*m*2 detects displacement from the target location, and continues to issue an instruction to the flight control module 120*m*1 so that the unmanned aircraft 100 stays directly above the target location. Furthermore, the flight position correction module 120*m*2 issues the instruction to the flight control module 120*m*1 to hold the altitude or ground altitude set to the flight plan route. This causes the unmanned aircraft 100 to hover at the same altitude or ground altitude as during movement along the flight plan route, directly above the target location. Alternatively, the flight position correction module 120*m*2 may issue the instruction to the flight position correction module 120*m*2 so that the altitude or ground altitude is different from that during the movement along the flight plan route, when the unmanned aircraft 100 comes directly above the target location. Preferably, the unmanned aircraft is controlled to hover at an altitude or ground altitude that is lower than that during the movement along the flight plan route. In this case, a length of the tether 112 to be extended can be shortened, and hence the delivery object 150 can be more quickly and accurately lowered down to the target location and released.

(Delivery Object Release Process) Hereinafter, a detailed process of the delivery object release process will be described. For the delivery object release process, description will be made as to three embodiments of (1) an automatic release type that the delivery object 150 is automatically released by the attaching/detaching mechanism 113 when grounded, (2) a ground detection type that the information processing unit 120 detects that the delivery object 150 is grounded, and releases the attaching/detaching mechanism 113, and (3) an altitude detection type that the information processing unit 120 detects that the release altitude of the delivery object 150 is reached, and releases the attaching/detaching mechanism 113. Note that these embodiments may be combined, as long as the delivery object 150 is released from the attaching/detaching mechanism 113 at a ground or release position.

(Delivery Object Release Process (Automatic Release Type))

Figure 7:
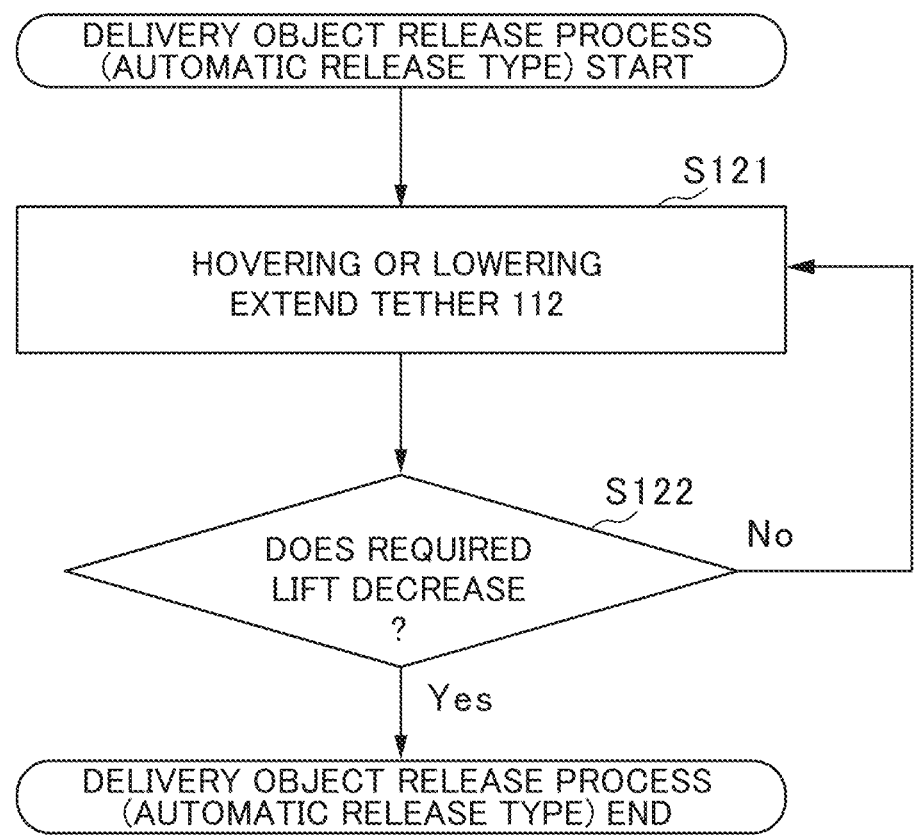
FIG. 7 is an operation flowchart of a delivery object release process (an automatic release type) by the unmanned aircraft according to the embodiment of the present invention.

In this embodiment, the attaching/detaching mechanism 113 includes the above described automatic release mechanism, and the delivery object 150 is automatically released when grounded. FIG. 7 is an operation flowchart of the delivery object release process (the automatic release type) by the unmanned aircraft 100. When the unmanned aircraft 100 reaches the target location and starts hovering, the tether control module 120*m*3 issues the instruction to the tether extending/retracting mechanism 111 to extend the tether 112 (step S121). Specifically, the winch of the tether extending/retracting mechanism 111 is rotated with the power of the motor or the like, to pick up the tether 112 and lower the delivery object 150. Note that the delivery object 150 can be lowered also by lowering the unmanned aircraft 100 to a certain degree and then extending the tether 112, by extending the tether 112 to a certain degree and then lowering the unmanned aircraft 100, by extending the tether 112 while lowering the unmanned aircraft 100, or only by lowering the unmanned aircraft 100. Next, the tether control module 120*m*3 determines whether the flight control module 120*m*1 decreases lift required to hover at a constant altitude (or to lower at a constant speed, during lowering) as much as a predetermined decrease amount (step S122). Consequently, it can be detected whether the delivery object 150 is grounded and the automatic release mechanism is operated. It is preferable that the tether control module 120*m*3 stores the predetermined decrease amount of the lift based on a weight of the delivery object 150. The predetermined decrease amount is a size of lift corresponding to the weight of the delivery object 150, and can be represented by an absolute value of the decrease of the lift, but is more preferably represented by a decrease ratio of the lift. The lift is associated with the number of rotations of the rotor 103 and an operating voltage to be supplied to the motor 102, because a ratio of increase/decrease of the lift can be almost similarly controlled by controlling a ratio of increase/decrease of the operating voltage. As a ratio of the weight of the delivery object 150 to a weight of the whole unmanned aircraft 100, on which the delivery object 150 is mounted, increases, the decrease ratio of the lift increases. It is detected that with an instruction signal to the control signal generation unit 122 that prescribes the operating voltage to be supplied to the motor 102 connected to the rotor 103, decrease of the voltage corresponding to the predetermined decrease amount of the lift is instructed, to detect the predetermined decrease amount of the lift. That is, if the delivery object 150 is grounded and the automatic release mechanism is operated, the weight of the unmanned aircraft 100 decreases as much as the weight of the delivery object 150, and the unmanned aircraft 100 attempts to rise. The flight control module 120*m*1 that detects such a behavior executes control to decrease the number of rotations of the rotor 103 and decrease the lift, and attempts to keep the constant altitude. The tether control module 120*m*3 detects that the flight control module 120*m*1 executes to control to decrease the lift as much as the predetermined decrease amount, so that it can be detected that the delivery object 150 is grounded and the automatic release mechanism is operated. Note that it can be detected that the delivery object 150 is grounded and the automatic release mechanism is operated, also by detecting upward acceleration at which the unmanned aircraft 100 attempts to rise, immediately after the automatic release mechanism is operated. This acceleration is also a value corresponding to the weight of the delivery object 150. If the tether control module 120*m*3 determines that the lift is decreased as much as a predetermined size, the module determines that the delivery object 150 is grounded and the automatic release mechanism is operated, to release the delivery object 150, and the module stops extending the tether 112. In a case where the unmanned aircraft 100 is lowered, the lowering is stopped. Consequently, it is determined that the delivery object 150 is delivered to the target location, and the delivery object release process is completed. Note that after the delivery object 150 is released from the attaching/detaching mechanism 113, the tether control module 120*m*3 may rotate the winch of the tether extending/retracting mechanism 111 with the power of the motor or the like in a reverse direction, and may wind the tether 112 up to the attaching/detaching mechanism 113 near the tip of the tether. If the tether control module 120*m*3 determines that the lift is not decreased, the module returns to the step S121, to continue to extend the tether 112.

Note that in this embodiment, it is detected with change in lift that the delivery object 150 is grounded and the automatic release mechanism is operated, and this can be detected by another method. For example, a switch interlocked with the automatic release mechanism may be attached to the attaching/detaching mechanism 113, and it may be detected with an electric signal that the automatic release mechanism is operated. Alternatively, a structure (a conspicuous color flap or the like) where visually large change occurs when the automatic release mechanism is operated may be attached to the attaching/detaching mechanism 113, and an image of the image data obtained from the camera 106 may be recognized by the image processing unit 124, so that it can be detected that the automatic release mechanism is operated.

(Delivery Object Release Process (Ground Detection Type))

Figure 8:
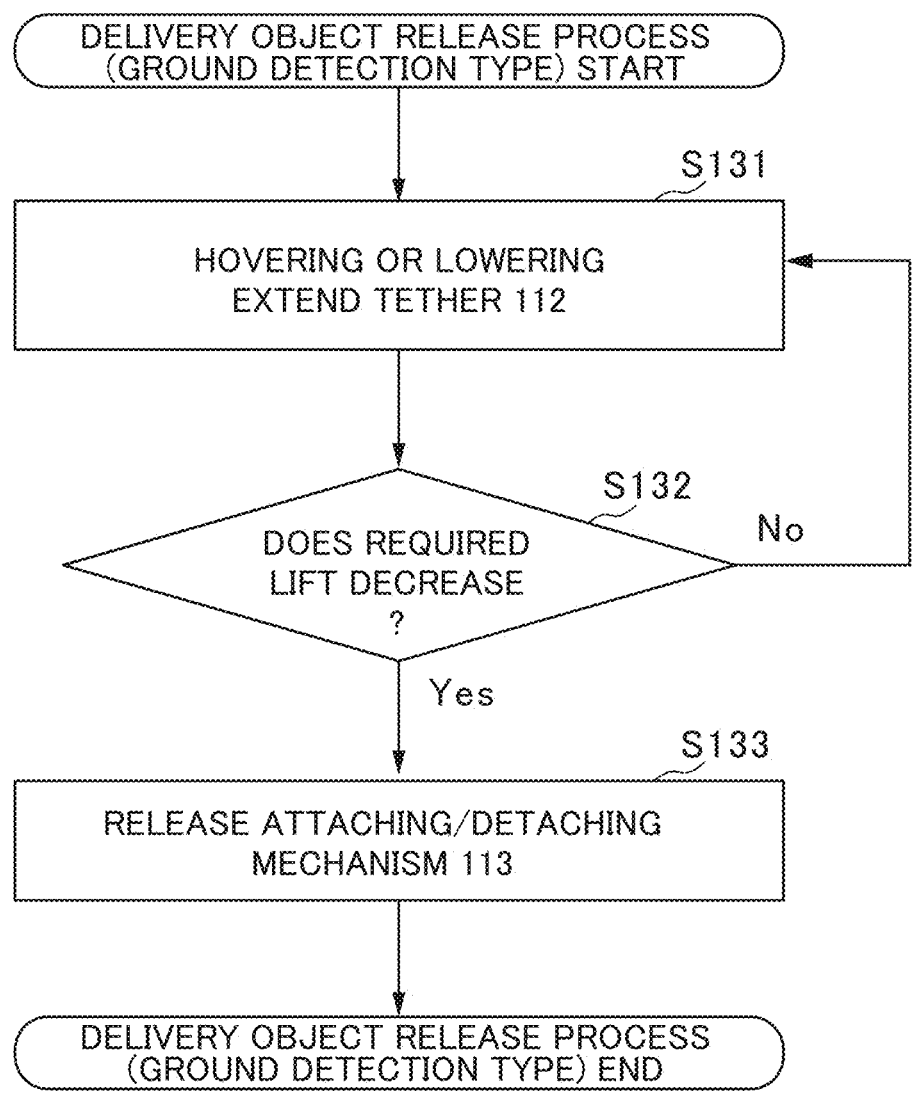
FIG. 8 is an operation flowchart of a delivery object release process (a ground detection type) by the unmanned aircraft according to the embodiment of the present invention.

In this embodiment, the attaching/detaching mechanism 113 includes the lock mechanism to be driven with the solenoid or the like. If the delivery object 150 is detected to be grounded, the object is released according to the instruction. FIG. 8 is an operation flowchart of the delivery object release process (the ground detection type) by the unmanned aircraft 100. When the unmanned aircraft 100 reaches the target location and starts hovering, the tether control module 120*m*3 issues the instruction to the tether extending/retracting mechanism 111 to extend the tether 112 (step S131). Specifically, the winch of the tether extending/retracting mechanism 111 is rotated with the power of the motor or the like, to pick up the tether 112 and lower the delivery object 150. Note that the delivery object 150 can be lowered also by lowering the unmanned aircraft 100 to the certain degree and then extending the tether 112, by extending the tether 112 to the certain degree and then lowering the unmanned aircraft 100, by extending the tether 112 while lowering the unmanned aircraft 100, or only by lowering the unmanned aircraft 100. Next, the tether control module 120m3 determines whether the flight control module 120m1 decreases the lift required to hover at the constant altitude (or to lower at the constant speed, during the lowering) as much as the predetermined decrease amount (step S132). This determination can be performed in the same manner as in the above described step S122. If the tether control module 120m3 determines that the lift is decreased as much as a predetermined size, the module determines that the delivery object 150 is grounded, to stop extending the tether 112, and issues an instruction to release the lock mechanism of the attaching/detaching mechanism 113 (step S133). In a case where the unmanned aircraft 100 is lowered, the lowering is stopped. Consequently, the delivery object 150 is grounded and then released from the attaching/detaching mechanism 113, and the delivery object 150 is delivered to the target location, thereby completing the delivery object release process.

Note that after the delivery object 150 is released from the attaching/detaching mechanism 113, the tether control module 120m3 may rotate the winch of the tether extending/retracting mechanism 111 with the power of the motor or the like in the reverse direction, and may wind the tether 112 up to the attaching/detaching mechanism 113 near the tip of the tether. If the tether control module 120m3 determines that the lift is not decreased, the module returns to the step S131, to continue to extend the tether 112.

(Delivery Object Release Process (Altitude Detection Type))

Figure 9:
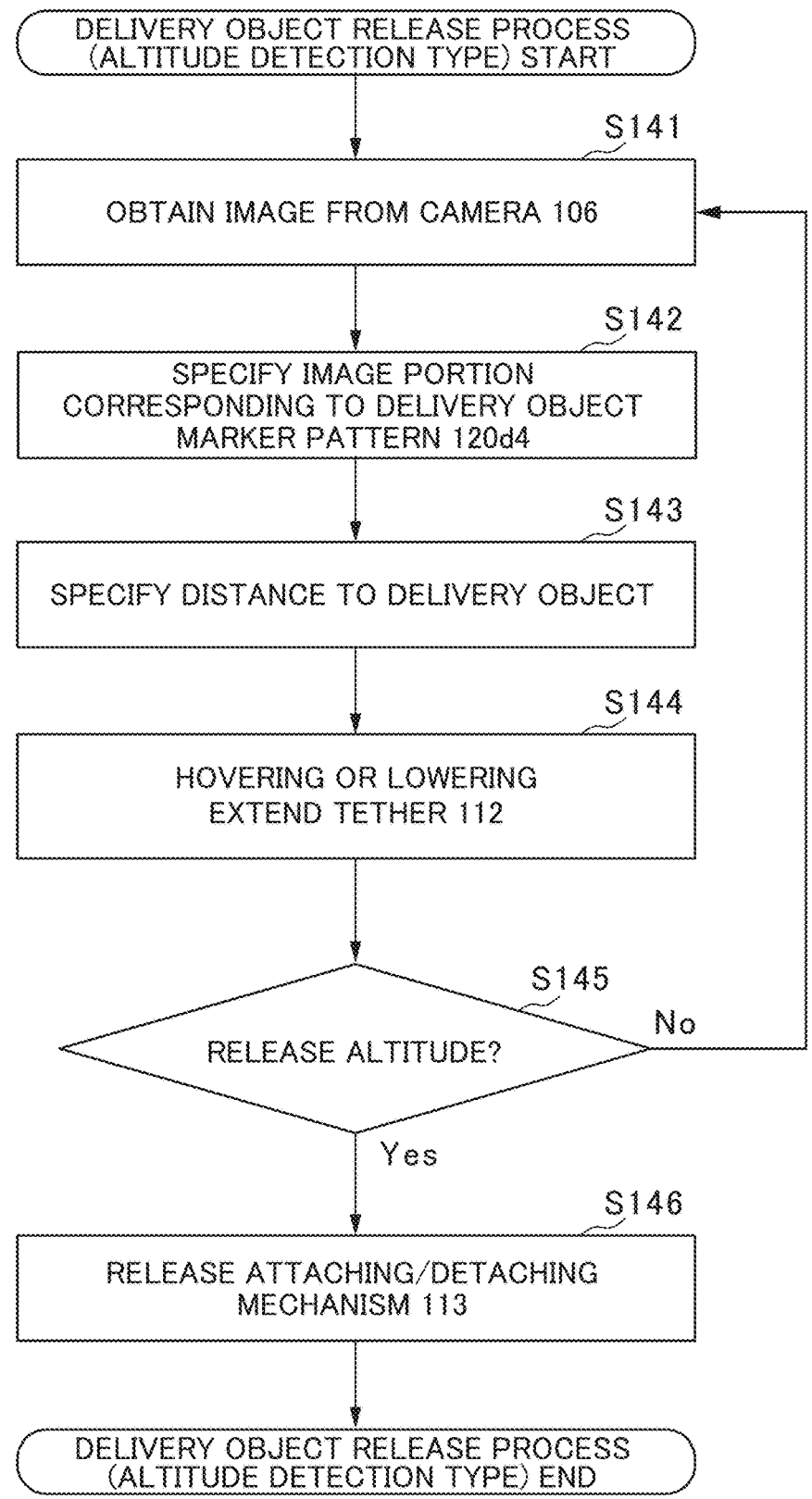
FIG. 9 is an operation flowchart of a delivery object release process (an altitude detection type) by the unmanned aircraft according to the embodiment of the present invention.

In this embodiment, the altitude of the delivery object 150 is detected. If the delivery object 150 reaches a predetermined release altitude, the attaching/detaching mechanism 113 including the lock mechanism to be driven with the solenoid or the like is released according to the instruction. FIG. 9 is an operation flowchart of the delivery object release process (the altitude detection type) by the unmanned aircraft 100. The release altitude can be, for example, a position several tens of centimeters above the target location. Alternatively, the release altitude may be set to zero, so that the attaching/detaching mechanism 113 can be released when the delivery object 150 is grounded. If the unmanned aircraft 100 reaches the target location to start hovering, the tether control module 120m3 obtains the image data from the camera 106 including the shooting range having the center in the directly lower direction (step S141). The image processing unit 124 refers to the delivery object marker pattern 120d4, so that the image portion of the delivery object marker 162 can be specified. The image processing unit 124 searches the obtained image for the image portion corresponding to the delivery object marker pattern 120d4, and specifies the portion (step S142). For the recognition of the image portion, the known image recognition technology may be used. The tether control module 120m3 specifies the distance to the delivery object 150 based on the image recognition result (step S143). Specifically, the module obtains the distance between the unmanned aircraft 100 and the delivery object marker 162 based on the information of the size of the image portion and the size of the delivery object marker 162. This process can be executed similarly to the step S113. Consequently, a suspending length can be specified that is a distance from a lower surface of the unmanned aircraft 100 to a portion of the delivery object 150 suspended by the tether 112 below the unmanned aircraft 100. Then, the suspending length is subtracted from the ground altitude of the unmanned aircraft 100, so that the altitude of the delivery object 150 from the ground can be specified. In a case of detecting that the delivery object 150 is grounded, it may be detected that the altitude of the delivery object 150 from the ground is zero. Note that accurately, in consideration of a total height of the delivery object 150, a value obtained by adding the total height of the delivery object 150 to the suspending length is subtracted from the ground altitude, so that the altitude of the lower surface of the delivery object 150 from the ground may be used as the altitude of the delivery object 150 from the ground. Furthermore, it may be detected that the delivery object 150 is grounded, by detecting that the delivery object marker 162 does not lower anymore. Note that the flight position correction module 120m2 can precisely obtain the ground altitude of the unmanned aircraft 100 based on the recognition result obtained when the image processing unit 124 recognizes the image portion of the target location marker 161 obtained by the camera 106.

Figure 10:
FIG. 10 is an image of a delivery object that is captured from a camera, the delivery object being suspended above a target location and lowered when the tether is extended in the delivery object release process (the altitude detection type) by the unmanned aircraft according to the embodiment of the present invention.
Figure 11:
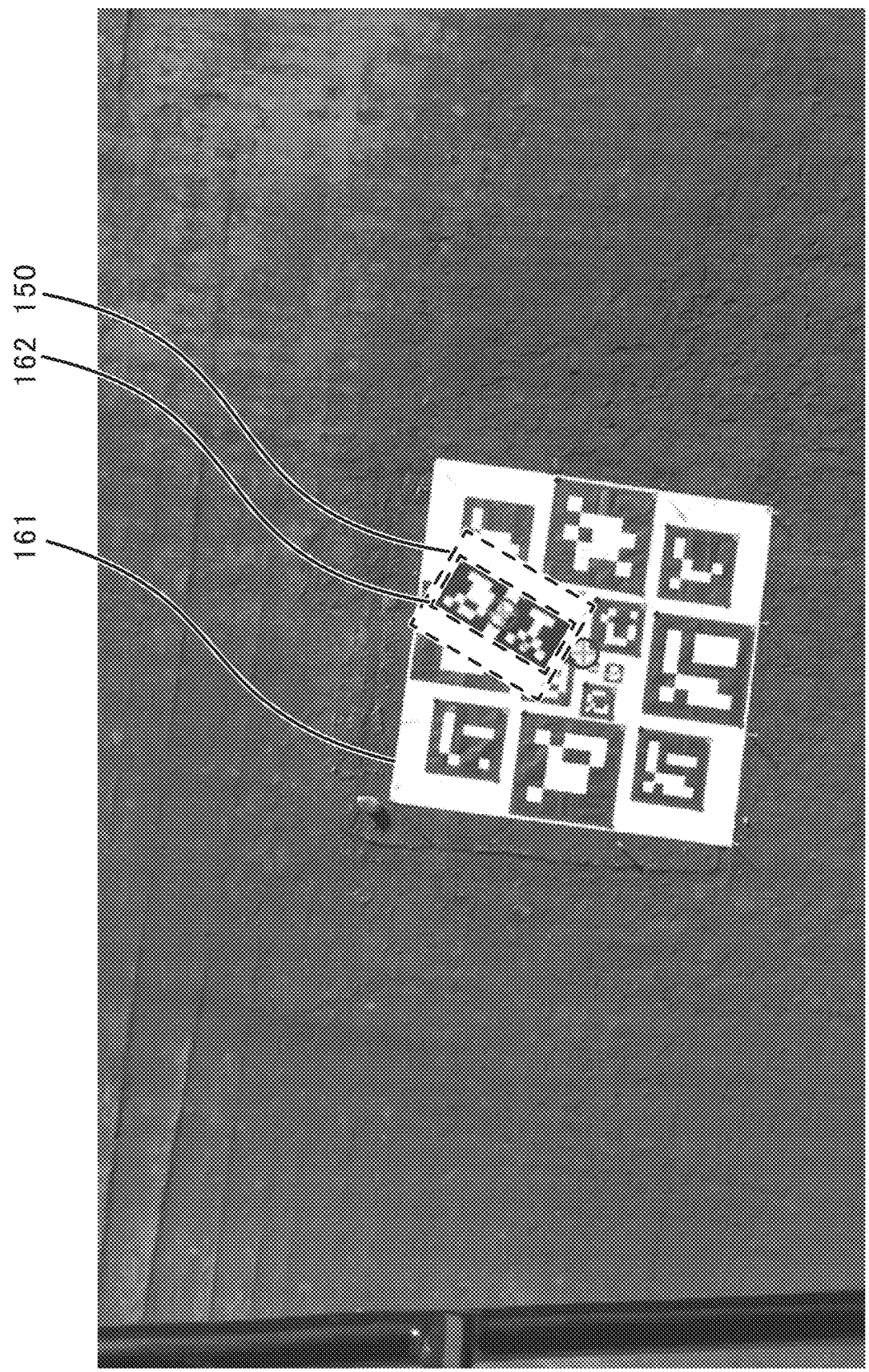
FIG. 11 is an image of the delivery object that is captured from the camera, the delivery object being suspended above the target location and lowered when the tether is extended in the delivery object release process (the altitude detection type) by the unmanned aircraft according to the embodiment of the present invention.

FIGS. 10 to 12 are images of the delivery object that are captured from the camera 106, when the delivery object suspended above the target location is lowered by extending the tether in the delivery object release process (the altitude detection type) by the unmanned aircraft 100. Each of these drawings is the image output from the image processing unit 124 in a state where the image recognition result is superimposed on the image, a quadrangle is added to surround the image portion recognized as a specific pattern, and a mark of a plus surrounded with a circle is added to a position determined as a center of a specific object. FIGS. 10 to 12 show that a plurality of two-dimensional codes forming the target location marker 161 around the target location are arranged around the target location, and the delivery object 150 including the delivery object marker 162 attached to the upper surface thereof is suspended in an almost vicinity of the center. The target location marker 161 shown in FIG. 10 or the like is a pattern in which a plurality of two-dimensional codes are arranged to wrap around the target location. Alternatively, a pattern may be used in which one or more two-dimensional codes are arranged at a specific relative position of the target location. The delivery object marker 162 shown in FIG. 10 or the like is a pattern in which two two-dimensional codes are arranged. Alternatively, a pattern may be used in which one or three or more two-dimensional codes are arranged. In FIG. 10, the delivery object 150 is at an altitude slightly higher than the target location, and the delivery object 150 is at a position displaced upward from the target location in the drawing. In FIG. 11, the delivery object 150 is at an altitude lower than that in FIG. 10, and displacement of the delivery object 150 from the target location is smaller. In FIG. 12, the delivery object 150 is at an altitude further lower than that in FIG. 11, and the displacement of the delivery object 150 from the target location almost disappears. Afterward, the delivery object 150 is grounded and released.

The tether control module 120m3 issues an instruction to the tether extending/retracting mechanism 111 to extend the tether 112 (step S144). Specifically, the winch of the tether extending/retracting mechanism 111 is rotated with the power of the motor or the like, the tether 112 is picked up, and the delivery object 150 is lowered. Note that the delivery object 150 can be lowered by lowering the unmanned aircraft 100 to a certain degree and then extending the tether 112, by extending the tether 112 to a certain degree and then lowering the unmanned aircraft 100, by extending the tether 112 while lowering the unmanned aircraft 100, or only by lowering the unmanned aircraft 100. The tether control module 120m3 determines whether the altitude of the delivery object 150 from the ground is less than or equal to the release altitude (step S145). Then, if the tether control module 120m3 determines that the altitude of the delivery object 150 from the ground is less than or equal to the release altitude, the module stops extending the tether 112, and issues an instruction to release the lock mechanism of the attaching/detaching mechanism 113 (step S146). In a case where the unmanned aircraft 100 is lowered, the lowering is stopped. This results in that the delivery object 150 is released at the release altitude directly above the target location and delivered to the target location, thereby completing the delivery object release process. Note that after the delivery object 150 is released from the attaching/detaching mechanism 113, the tether control module 120m3 may rotate the winch of the tether extending/retracting mechanism 111 with the power of the motor or the like in the reverse direction, and the tether 112 may be wound up to the attaching/detaching mechanism 113 near the tip of the tether. If the tether control module 120m3 determines in the step S145 that the altitude of the delivery object 150 from the ground is not less than nor equal to the release altitude, the module returns to the step S141 to continue a step of confirming whether the delivery object 150 is lowered down to the release altitude, based on the image obtained from the camera 106, while continuing to extend the tether 112.

Description has been made as to the embodiment of the unmanned aircraft according to the present invention, but the present invention is not limited to the above embodiment, and can be variously modified. The above embodiment corresponds to the case where the delivery object 150 is delivered to the target location, but this is merely an example, and it is not intended that the present invention is limited to this specific concrete example.

INDUSTRIAL APPLICABILITY

An unmanned aircraft of the present invention may be used in a variety of use applications such as physical distribution and observation.

REFERENCE SIGN LIST 100 unmanned aircraft
101 control unit
102 motor
103 rotor
104 arm
105 landing leg
106 camera
107 flight position sensor
108 antenna
111 tether extending/retracting mechanism
112 tether
113 attaching/detaching mechanism
120 information processing unit
120c main computing circuit
120d1 flight plan route data
120d2 target location data
120d3 target location marker pattern
120d4 delivery object marker pattern
120m1 flight control module
120m2 flight position correction module
120m3 tether control module
120p1 flight control program
120p2 flight position correction program
120p3 tether control program
121 communication circuit
122 control signal generation unit
123 speed controller
124 image processing unit
125 interface
150 delivery object
151 hook receptacle
161 target location marker
162 delivery object marker

The invention claimed is:

1. An unmanned aircraft including a tether having a predetermined portion to which a specific mechanism having a predetermined function is attached, said tether including an extending/retracting mechanism, comprising:
   a position sensor that detects a flight position of the unmanned aircraft,
   a camera that obtains an image below the unmanned aircraft,
   a memory that stores coordinate information of a target location that is a location to operate the specific mechanism, and a target location marker pattern representing an appearance of a target location marker that identifies the target location and is disposed to have a predetermined relative position relationship with the target location,
   an automatic flight control unit that controls the unmanned aircraft to fly from a departure position toward the target location, based on the flight position detected by the position sensor,
   a flight position correction unit that refers to the target location marker pattern, detects an image portion corresponding to the target location marker from the image obtained by the camera, obtains a relative position between the unmanned aircraft and the target location marker based on the detected image portion of the target location marker, and controls the automatic flight control unit to guide the unmanned aircraft directly above the target location based on the relative position, and
   a tether control unit that controls the extending/retracting mechanism to adjust a length of the tether,
   wherein the tether control unit extends the tether to an operating position where the specific mechanism is controlled to perform a specific operation, when a position of the unmanned aircraft is directly above the target location,
   wherein the specific mechanism is an attaching/detaching mechanism having a function of holding a delivery object,
   the operating position is a release altitude to release the delivery object from the attaching/detaching mechanism,
   the attaching/detaching mechanism is adapted to release the delivery object by the specific operation, and
   the target location is a position of a delivery destination of the delivery object, and
   wherein the delivery object has an upper surface to which a delivery object marker that identifies the delivery object is attached,
   the memory further stores a delivery object marker pattern representing an appearance of the delivery object marker, and
   the flight position correction unit refers to the delivery object marker pattern while the tether control unit extends the tether, and controls the automatic flight control unit to guide the unmanned aircraft so that the delivery object is lowered down to the target location based on an image portion of the delivery object marker that is included in the image obtained by the camera.

2. The unmanned aircraft according to claim 1, wherein the tether control unit extends the tether to the operating position based on the image obtained by the camera.

3. The unmanned aircraft according to claim 1, wherein the delivery object marker is a code pattern, and
the flight position correction unit specifies a three-dimensional position of the delivery object, based on a position and size of the image portion of the delivery object marker in the image obtained by the camera.

4. The unmanned aircraft according to claim 1, wherein the release altitude is a ground altitude at which the delivery object is grounded, and
the attaching/detaching mechanism includes an automatic release mechanism that releases the held delivery object, when the delivery object is grounded.

5. The unmanned aircraft according to claim 4, wherein the tether control unit senses decrease in lift required to keep the unmanned aircraft at a constant ground altitude, to determine that the delivery object is released from the attaching/detaching mechanism.

6. The unmanned aircraft according to claim 1, wherein the release altitude is a ground altitude at which the delivery object is grounded, and
the tether control unit releases the attaching/detaching mechanism, when sensing that the delivery object is grounded.

7. The unmanned aircraft according to claim 6, wherein the tether control unit senses decrease in lift required to keep the unmanned aircraft at a constant ground altitude, to determine that the delivery object is grounded.

8. The unmanned aircraft according to claim 1, wherein the tether control unit detects a distance between the unmanned aircraft and the delivery object marker, based on a size of the image portion of the delivery object marker that is included in the image obtained by the camera.

9. The unmanned aircraft according to claim 8, wherein the tether control unit releases the attaching/detaching mechanism when the delivery object is lowered down to the release altitude, based on the detected distance between the unmanned aircraft and the delivery object marker, and a ground altitude of the unmanned aircraft.

10. The unmanned aircraft according to claim 9, wherein the release altitude is the ground altitude at which the delivery object is grounded.

11. The unmanned aircraft according to claim 1, wherein the target location marker is a two-dimensional code pattern, and
the flight position correction unit specifies a three-dimensional relative position with the target location, based on a position and size of an image portion of the target location marker in the image obtained by the camera.

* * * * *